(12) United States Patent
Setten et al.

(10) Patent No.: US 6,723,434 B2
(45) Date of Patent: Apr. 20, 2004

(54) TILE

(75) Inventors: Heimo Setten, Villach (AT); Johann Kowalczyk, St. Magdalen (AT)

(73) Assignee: Villi Glas GmbH, Miklauzhof (AU)

( * ) Notice: Subject to any disclaimer, the term of this patent is extended or adjusted under 35 U.S.C. 154(b) by 0 days.

(21) Appl. No.: 10/378,886

(22) Filed: Mar. 5, 2003

(65) Prior Publication Data

US 2003/0138639 A1 Jul. 24, 2003

Related U.S. Application Data

(62) Division of application No. 09/674,837, filed as application No. PCT/AT99/00111 on May 6, 1999, now Pat. No. 6,544,587.

(30) Foreign Application Priority Data

May 7, 1998 (AT) .............................................. 763/98

(51) Int. Cl.[7] ......................... B32B 17/06; E04C 1/42; E04F 13/08
(52) U.S. Cl. ........................ 428/426; 428/432; 52/306; 52/389; 52/415; 52/573.1
(58) Field of Search .................................. 428/426, 432; 52/415, 390, 384, 389, 746.1, 306, 573.1, 749.11, 746.12

(56) References Cited

U.S. PATENT DOCUMENTS 3,962,504 A * 6/1976 Sherwin ..................... 428/40.1

FOREIGN PATENT DOCUMENTS

GB 1011633 * 12/1965

* cited by examiner

*Primary Examiner*—Deborah Jones
*Assistant Examiner*—G. A. Blackwell-Rudasill
(74) *Attorney, Agent, or Firm*—Dykema Gossett PLLC

(57) ABSTRACT

The invention relates to a tile for placing on walls, floors or the like using adhesive mortar. The inventive tile comprises a transparent glass layer (1) and a colored layer (4) which is placed on the rear side of the glass layer. In order to obtain a particular optical effect, the glass layer (1) is heat treated and the colored layer (4) is comprised of a lacquer which is compatible with adhesive mortar.

8 Claims, No Drawings

TILE

The present invention relates to a tile according to the preamble of claim 1.

Ceramic tiles have long been used for finishing walls and floors in buildings. Important properties of such tiles are that they can be placed easily using adhesive mortar and that these tiles have a hard and water impervious surface. Tiled surfaces may furthermore be covered with tiles of appropriate colours and patterns for aesthetic appeal.

It has also been known to manufacture tiles of coloured, opaque glass, such tiles being used in mosaics for example.

Due to the inner structure of ceramic tiles, the colour coating of such tiles is naturally given by the composition of the glaze. Accordingly, the colour effect is always superficial. Even on penetratingly coloured glass tiles, the colour effect is merely superficial, since the rays of light cannot penetrate inside the glass layer to a noteworthy extent. Another drawback of conventional glass tiles is that they cannot be trimmed with the commonly available means for tiling. Such glass tiles therefore are especially suitable for being used in mosaics since here, the individual tile must not be trimmed. On tiling surfaces with tiles having a conventional size, e.g., 20×30 cm, the shape of a plurality of tiles has to be trimmed to conform to corners in a room, doors, windows, switches, fittings and the like. Since a majority of tilers are not equipped with the tools and do not dispose of the know-how of those skilled in the art of glass working, tiling with glass tiles has not been hereto before possible on a commercial scale.

The document AT 304 033 B relates to panes, panels, tiles, tesserae made of transparent glass, the rear side of which is provided with a coating of natural or artificial fish silver.

This permits to achieve novel optical and aesthetic effects when such panels are used as tesserae for example. In no event however is it possible to trim them like tiles owing to the structure of the glass.

The GB 2 271 529 A discloses a glass tile which has a rear side that is provided with a layer of glue and that finally has thereupon a coating of magnesium oxide. Such a glass tile has a very complicated multilayered structure that renders its manufacturing complicated and expensive. Additionally, such a tile cannot be trimmed for tiling due to the given properties of glass, i.e., the cutting out of recesses or the trimming of the tile is extremely complicated.

The object of the present invention is to provide a tile that, in its optical appearance, is clearly defined over conventional tiles and that can be trimmed in principle in the same way as a ceramic tile.

The solution of these objects is to submit the glass layer to a heat treatment until it begins to soften and that the coloured layer consists of a mineral lacquer.

By thermally treating the glass layer, a microstructural change occurs that permits to break the glass in a controlled way during the trimming process. Stated in general terms, two different processing operations occur in the tiling process: in a first processing operation a tile must be cut along a straight line, this being usually performed by having the tile scribed along the parting line by means of a cutting wheel made of a hard metal prior to breaking it. The other type of processing operation is necessary when a recess must be provided in a tile, for a switch, a socket or a sanitary connection for example. In such cases, the tweaking out of the recess is often accomplished by means of appropriately shaped pliers (glazier's pliers) or with water-cooled diamond cutting wheels. With the tile according to the invention, both types of processing operations may be conducted in a way essentially analogous to the way ceramic tiles are processed. As a result, the tile according to the invention can be processed by tilers without requiring any particular measures. The performing of accurate borings is the only action that is somewhat more complicated on the tiles of the invention than on ceramic tiles.

Another major point of the invention is that the coat of lacquer is not attacked by the adhesive mortar used for tiling. This means that during tiling, the coat of lacquer does not react chemically with the strongly alkaline adhesive mortar, which leads for example to a change in colour or which causes the coat of lacquer to detach from the layer of glass.

The tile according to the invention makes it possible to realize an appearance which differs completely from that of conventional tiles. Since the structure of the colours constituting the pattern of the tile is located behind a transparent layer of glass, a three-dimensional aspect of the tile is created. Through various refraction effects and the like, effects are obtained which cannot be observed on conventional tiles.

In principle, it is possible to utilize for the coloured layer a two-component enamel. A two-component acrylic enamel as it has specifically been evolved for the overall or partial paintwork of utility vehicles, road tank cars, buses and the like, would be particularly suitable therefor. Important features within the spirit of the invention are the high mechanical and chemical stability and the durable gloss-life as well as the fastness to petrol, fats and other solvents. Mineral lacquers perfectly fulfill these conditions. It is preferably question of enamel varnishes, i.e., glass powder into which pigments have been incorporated and which is made pasty for application by screen printing.

The three-dimensional structural effect of the inventive tile can still be enhanced by the fact that the surfaces of the glass layer are not smooth. By structuring the surfaces, i.e., by giving them an undulated design, particularly interesting effects are achieved from an aesthetical point of view.

In addition to the coloured layer applied onto the rear side of the glass layer, said layer of glass can also be provided with an internal colour structure. This means that the glass is coloured entirely or at specific places. It must be made certain that the glass be transparent at least in some areas in order to achieve the effects described above.

The coat of lacquer is preferably roughed in a drying treatment. This means that the coloured layer per se is provided on its outer surface with a microscopic roughness. This roughness, as contrasted with the optional structure given to the surface of the glass, which is in the order of millimeters, has practically no optical influence on the appearance of the placed tile. The bond of adhesive mortar or the like however is considerably enhanced so that secure tiling is made certain.

The invention furthermore relates to a method for manufacturing a tile, the method involving the following steps:

cutting of a glass pane on a section to the desired shape of the tile, heat treatment of the section until it softens, cooling of the section to a temperature in the range of room temperature, application of a coat of mineral lacquer to one side of the section, and firing of the coat of lacquer at a temperature which is lower than the maximum temperature of the heat treatment.

Preferably, the softening point of the glass should be exceeded in the heat treatment. In general, this is achieved by heating to a maximum temperature ranging from 750° to 850°.

During the cooling phase it is advantageous to provide for several AC-points in order to achieve the most advantageous structure of the glass. In a particularly preferred embodiment of the method according to the invention, the heat treatment is conducted while the piece is laid on a bed of moulding sand, wherein a particular three-dimensional effect can be obtained when the bed of pulverized asbestos is given a structure prior to placing the piece there onto, wherein the structure may be achieved by pressing a pattern into the bed of sand by means of a stamp or a roller.

Customarily, heat treatment is carried out by placing the glass panes to be treated into the cold furnace. This furnace is then heated to the maximum temperature, which depends on the type of glass and the thickness of the material. The essential point with heat treatment is the cooling phase, in which various Ac-points must be provided for. By providing these Ac-points, it is possible to have the finished glass tile largely stress-relieved, which is essential for further processing and for durability. In the following example of an embodiment, a typical process sequence for heat treatment is illustrated on a glass tile 8 mm thick:

| Phase | Initial Temperature | Ac-Temperature | Final Temperature | Duration |
|---|---|---|---|---|
| 1 | 18° C. | | 250° C. | 30 min |
| 2 | | 250° C. | | 10 min |
| 3 | 250° C. | | 750° C. | 90 min |
| 4 | | 750° C. | | 10 min |
| 5 | 750° C. | | 785° C. | 18 min |
| 6 | | 785° C. | | 20 min |
| 7 | 785° C. | | 520° C. | rapid |
| 8 | | 520° C. | | 50 min |
| 9 | 520° C. | | 485° C. | 40 min |
| 10 | | 485° C. | | 40 min |
| 11 | 485° C. | | 320° C. | 120 min |
| 12 | 320° C. | | 18° C. | 300 min |

Upon completion of heat treatment, the section is cooled to room temperature and is printed, e.g., in a screen-printing method, with an enamel lacquer. Immediately after the printing procedure, the tile is dried in an infrared tunnel kiln at a temperature of about 180° C. The dwell time is of approximately 30 seconds. The instant action of heat effects a fast dehydration of the lacquer, the lacquer surface being roughed to a microscopic scale as a result thereof. When several coloured layers are applied to the tile, drying treatment is performed immediately upon the application of each of the coloured layers. Once the last coloured layer has been applied and dried, a protective coating is applied to the tile, firing is carried out at a temperature of about 580° C. to about 620° C. This temperature is maintained for about 20 minutes. The protective coating on light tiles is generally white, otherwise black, and serves to prevent the surface upon which the tiles have been laid from shining through. The colours are definitively fixated by firing. It is important that the tile cools down in the closed furnace over a period of about 3 to 4 hours or more once firing is over. Thus, unwanted hardening of the glass may be prevented. With this treatment, the roughed structure is preserved, which provides for the excellent stability in processing.

The invention is explained in more detail with the help of an embodiment illustrating an example and represented in the FIGURE.

BRIEF DESCRIPTION OF THE FIGURE

The FIGURE depicts a sectional view of a preferred embodiment of the tile according to the invention.

DESCRIPTION OF THE PREFERRED EMBODIMENT

As shown in the FIGURE, the tile is formed of a layer of glass 1 having a face side 2 and a rear side 3. A coloured layer 4 made of a two-component lacquer is applied to the rear side 3. This may be a glazing glass colour 13 710 made by CERDEC Chemische Farben in Frankfurt, Germany having as main components Pb, Si, Cd, Li, Na, Ti, B, Al. Other lacquers are also possible, whose colour compounds are made of pigmented glass powder. It may be seen that neither the face side 2 nor the rear side 3 are completely even, but that they rather are provided with an undulated structure. The optical effect of the tile is caused by the incident rays of light 5, which are refracted at the face side 2, reach the coloured layer 4, are reflected and exit again at the face side 2. Owing to the uneven structure of the surfaces 2 and 3, refraction and reflection are different at various locations on the tile. A particular optical effect is thus obtained. It can also be seen in the FIGURE that due to the surface tension of the tile occasioned by heat treatment, the edges are not sharp but rounded. This in fact that is commonly wanted with tiles.

It is obvious to one having ordinary skill in the art that the glass layer 1 may also be composed of several identical or different layers of glass which are melted together either partially or entirely.

The present invention permits to use extensively on a commercial scale tiles made of glass in a manner similar to ceramic tiles.

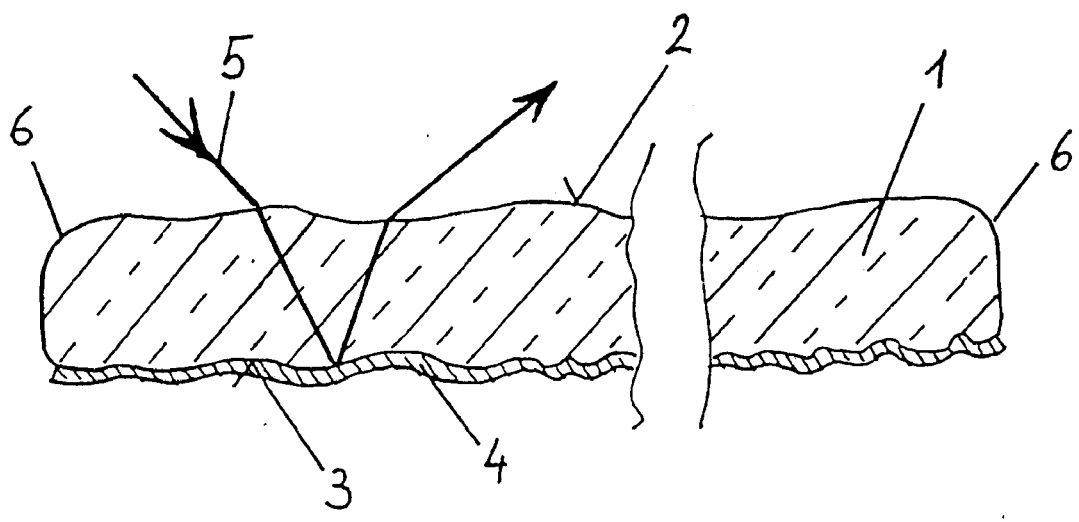

What is claimed is:

1. Tile consisting of a transparent glass layer having a rear side to be placed on walls, floors and the like using adhesive mortar and an opposite front side, wherein a coloured layer is placed on said rear side said glass layer, the overall glass layer being submitted to a heat treatment until it softens and the coloured layer consists of a mineral lacquer burned into the glass layer, wherein the coloured layer constitutes the rear side of the tile and is roughed in a drying treatment.

2. Tile according to claim 1, wherein the lacquer is an enamel varnish.

3. Tile according to claim 1, wherein the surface of the glass is structured.

4. Tile according to claim 1, wherein the rear side of the glass layer is structured.

5. Tile according to claim 1, wherein said front and rear sides of said glass layer are undulating.

6. The combination of a supporting surface, a tile defining front and rear sides, and adhesive mortar located between the supporting surface and said rear side of said tile for mounting said tile on said supporting surface, said tile consisting of a transparent glass layer and a colored layer of mineral lacquer in said rear side of said glass layer, said colored layer displaying microscopic roughness.

7. The combination according to claim 6, wherein said mineral lacquer is an enamel varnish.

8. The combination according to claim 6, wherein said front and rear sides of said glass layer are undulating.

* * * * *

UNITED STATES PATENT AND TRADEMARK OFFICE
CERTIFICATE OF CORRECTION

PATENT NO. : 6,723,434 B2
DATED : April 20, 2004
INVENTOR(S) : Heimo Setten et al.

It is certified that error appears in the above-identified patent and that said Letters Patent is hereby corrected as shown below:

Add the figure as shown on the attached page.

Signed and Sealed this

Twenty-seventh Day of July, 2004

JON W. DUDAS
*Acting Director of the United States Patent and Trademark Office*